April 12, 1932.  O. J. T. G. R. MARTIN  1,853,067
AGITATOR
Filed Nov. 26, 1930
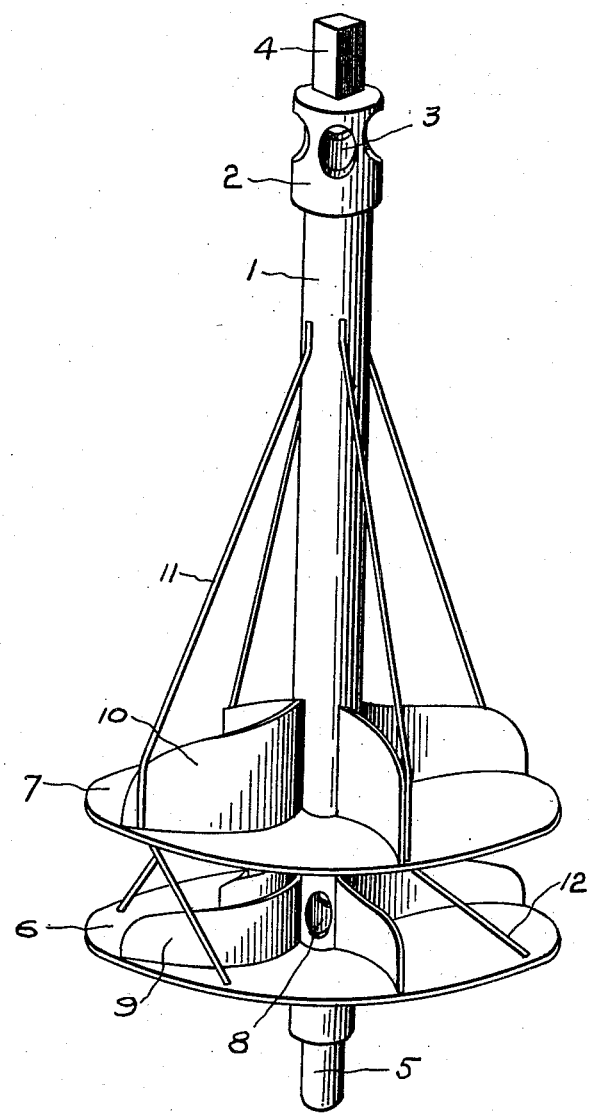
INVENTOR
OTTO JOSEPH THOMAS GUSTAVE RICHARD MARTIN
BY  *Fetherstonhaugh & Co*
ATTORNEYS Patented Apr. 12, 1932

1,853,067

UNITED STATES PATENT OFFICE

OTTO JOSEPH THOMAS GUSTAVE RICHARD MARTIN, OF VANCOUVER, BRITISH COLUMBIA, CANADA, ASSIGNOR TO ALFRED CHARLES HUTTON AND ARCHIBALD STUART PITHER, BOTH OF VANCOUVER, CANADA

AGITATOR

Application filed November 26, 1930, Serial No. 498,360, and in Canada March 6, 1930.

My invention relates to improvements in agitators for churns and the like which are particularly adapted for use in small churns and other devices for household use where relatively small quantities of fluid are required to be agitated. The object of the invention is to provide means whereby the fluid treated is aerated by the kinetic energy imparted to the fluid by the agitator and also to provide means whereby the necessary agitation is completed more rapidly than by such agitators as are generally used.

The invention consists of a tubular shaft provided with upper and lower orifices for the introduction and discharge of air respectively, and radiating vanes secured adjacent the lower end of the shaft, as will be more fully described in the following specification and shown in the accompanying drawing.

The drawing is a general view of the invention.

The numeral 1 indicates generally a tubular shaft provided at its upper end with a hollow cylindrical member 2 having a plurality of air inlet orifices 3 communicating with the interior of the shaft 1 and having a concentrically mounted shank 4 of any suitable type which is adapted to be connected to the vertical driving shaft (not shown) of the churn.

The lower end of the shaft 1, in devices of relatively large capacity, would be provided with a shaft extension 5 which would be suitably journalled in a step bearing (not shown), but in churns of small capacity this shaft extension could be omitted. Fitted adjacent the lower end of the shaft, and adapted to be constantly submerged when in use, are spaced discs 6 and 7 between which discharge orifices 8 are formed in the walls of the tubular shaft 1.

Immediately in advance of each of the orifices 8 is a curved impeller blade 9 having its lower edge in contact with the surface of the disc 6 and of such a depth as to leave a space between the top edge of each blade and the disc 7 equal to the vertical width of the blade, so as to permit an inward flow of fluid between the top of the blades and the disc 7. A plurality of upper impeller blades 10 are mounted upon the discs 7 and extend outwards from the tubular shaft 1 and are suitably curved to produce the required agitation. A plurality of wires 11 extend divergingly downwards from the medial portion of the tubular shaft 1 to the periphery of the disc 7, which wires are then carried diagonally downwards as at 12 and are connected at their lower ends to the disc 6. These wires serve to break up the liquid acted upon by the blades 9 and 10 and to intimately distribute the air drawn downwards into the liquid through the tubular shaft.

The agitator is secured to a vertical shaft of a churn or other mixer and is rotated thereby at sufficient speed to impart a swirling motion to the fluid to be agitated. The effect of the lower blades 9 is to cause a flow of fluid and air drawn from the tubular shaft tangentially outwards, which is followed by the liberation of air bubbles upwards past the disc 7 and an inward flow of fluid below the disc 7 and above the blades 9 for recirculation. The upper blades 10 cause a further tangential flow which serves to break up the air bubbles from below and still further aerate the fluid, which then circulates upwards adjacent the side walls of the container in which the agitator is placed, thence inwards and downwards adjacent the tubular shaft back to the impeller or blades 10. The wires 11 also serve to break up the air bubbles and spread them throughout the body of the fluid.

What I claim as my invention is:

An agitator comprising a vertical tubular shaft having an air inlet at its upper end and an air outlet adjacent its lower end, a pair of spaced discs, one above and one below the air outlet, a plurality of curvilinear blades upon each of the discs, and a plurality of taut wires extending divergingly downwards from the upper end of the shaft to the periphery of the upper disc and from thence to the periphery of the lower disc, the portion of the wires extending between the discs being helically arranged.

Dated at Vancouver, B. C., this 20th day of November, 1930.

OTTO JOSEPH THOMAS GUSTAVE RICHARD MARTIN.